United States Patent [19]

Kishi

[11] Patent Number: 5,186,603
[45] Date of Patent: Feb. 16, 1993

[54] AIR MOTOR
[75] Inventor: Katsunobu Kishi, Tokyo, Japan
[73] Assignee: Nitto Kohki Co., Ltd., Tokyo, Japan
[21] Appl. No.: 763,222
[22] Filed: Sep. 20, 1991
[30] Foreign Application Priority Data Sep. 29, 1990 [JP] Japan .................................. 2-103290
Jun. 12, 1991 [JP] Japan .................................. 3-167562

[51] Int. Cl.$^5$ ............................................. F03B 13/04
[52] U.S. Cl. ...................................... 415/80; 415/82; 415/903; 415/904
[58] Field of Search ................ 415/80, 82, 202, 203, 415/206, 901, 902, 903, 904

[56] References Cited

U.S. PATENT DOCUMENTS

| 3,304,051 | 10/1964 | Calhoun | 415/904 |
|---|---|---|---|
| 3,707,336 | 12/1972 | Theis et al. | 415/904 |
| 3,733,143 | 5/1973 | Theis | 415/80 |
| 4,060,336 | 1/1978 | Theis et al. | 415/904 |
| 4,087,198 | 5/1978 | Theis | 415/82 |
| 4,772,186 | 10/1988 | Pyles et al. | 415/904 |
| 4,776,752 | 10/1988 | Davis | 415/82 |

FOREIGN PATENT DOCUMENTS

| 2411202 | 4/1973 | Fed. Rep. of Germany | 415/80 |
|---|---|---|---|
| WO88/06676 | 9/1988 | PCT Int'l Appl. | |
| 956526 | 4/1964 | United Kingdom | |
| 1351721 | 5/1974 | United Kingdom | 415/343 |

Primary Examiner—Edward K. Look
Assistant Examiner—Mark Sgantzos
Attorney, Agent, or Firm—Nixon & Vanderhye

[57] ABSTRACT

The air motor of the present invention has an air chamber for taking compressed air in a rotor body fitted to a rotary shaft, forms a jet hole opening in the tangential direction of the rotor on the periphery of the rotor, jets compressed air from the jet hole, and gives torque to the rotor by the reaction of the jetted air. An air reservoir is installed between the air chamber and the jet hole which are connected to the air reservoir. When the load of the air motor increases, the speed of the rotor instantaneously decreases. However, the decreased speed immediately increases because a lot of compressed air stored in the air reservoir continuously jets from the jet hole.

9 Claims, 3 Drawing Sheets

AIR MOTOR

BACKGROUND OF THE INVENTION

1. Field of the Invention

The present invention relates to an air motor, particularly to an air motor used as a power unit for pneumatic tools.

2. Description of the Related Art

An air motor is conventionally used to drive rotational tools such as grinders and drills for grinding and cutting various types of materials because the air motor is suitable for light work and very safe. The air motor includes various types, in which the rotary-vane and turbine types are popular.

In the vane type motor, torque is generated when air pressure works on the adjacent pair of vanes which are radially displacably mounted on a rotor eccentrically installed in a casing.

In the turbine type motor, as already known, torque is generated by blowing air through the turbine.

However, the rotary-vane type motor cannot be made compact or lightweight because it requires many parts and high machining accuracy though it has high efficiency.

Meanwhile, the turbine type motor has the disadvantage that it has inadequate torque and it is difficult to quickly increase the speed decreased through operation and maintain the torque though the structure of the motor is simple and a high speed can be obtained.

That is, these motors have advantages and disadvantages. Therefore, a high-speed type air motor is not yet realized which is compact, lightweight, and which easily generates the required torque.

SUMMARY OF THE INVENTION

Therefore, it is an object of the present invention to provide an air motor which is the high-speed type, easily generates a required torque, and has a simple structure in order to solve the above problem.

To achieve the above object, the air motor according to the present invention comprises an air chamber to lead compressed air into a rotor fitted to a rotary shaft, a jet hole opening in the tangential direction of the rotor on the outer periphery of the rotor, the jet hole projecting compressed air to produce torque to the rotor by the reaction of the compressed air, and an air reservoir connected with both the air chamber and jet hole at a proper position in the rotor.

The compressed air introduced into the air chamber is jetted from the jet hole through the air reservoir and torque is generated in the rotor by the reaction of the jetted compressed air. Though the rotor speed instantaneously decreases when the air-motor load increases, the decreased rotor speed immediately increases because large amount of compressed air in the air reservoir is continuously jetted through the jet hole of the rotor. Therefore, the output does not suddenly decrease even if the load suddenly increases.

Because the air motor according to the present invention has a simple structure, it is compact, lightweight, and high-speed type, and easily generates a required torque. That is, though the rotor speed instantaneously decreases when the air motor load increases, the speed immediately recovers by the energy of the compressed air in the air chamber and air reservoir. Therefore, high output can always be obtained.

Moreover, the air-motor manufacturing cost decreases because the motor can be made of resin, the motor is easily assembled because it comprises a small number of parts, and the motor quickly corresponds to variation of the load applied to rotational tools because of its simple structure.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

Figure 1:
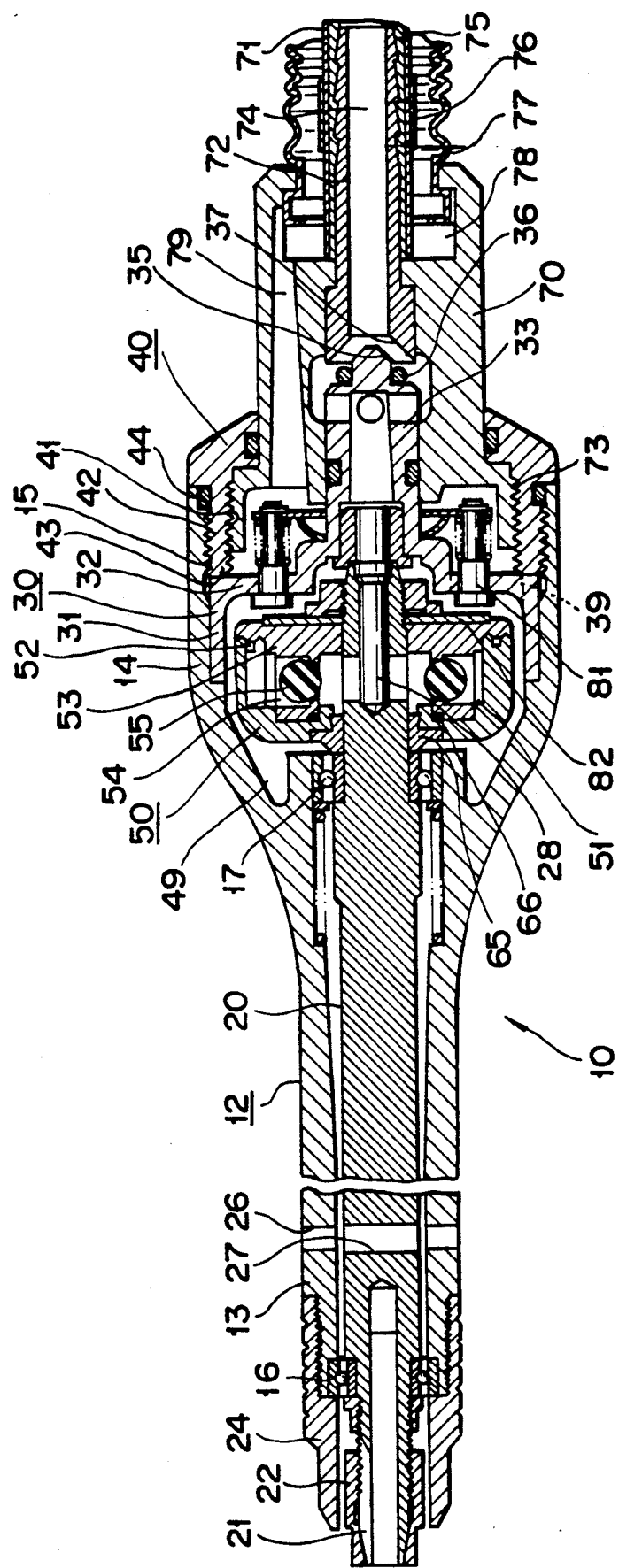
FIG. 1 is a longitudinal sectional view of a rotational tool using the air motor according to the present invention.

FIG. 1 is an embodiment of the air motor according to the present invention used as a power unit for a pneumatic handy tool, FIG. 1 illustrating a longitudinal sectional view of the pneumatic tool 10. In the following description, the side where a grinding or cutting tool is fixedly mounted on the pneumatic tool 10 is referred to as the front portion, front surface, or front end, and the side for supplying compressed air is referred to as the rear portion, rear surface, or rear end.

Numeral 12 indicates stepped cylindrical front housing of the tool 10. The front housing has a reduced diameter portion 13 in which a rotary shaft 20 is rotatably supported by bearings 16 and 17. The end portion 21 of the rotary shaft 20 is formed into a chuck and a grinding tool such as a rotary air grinder (not illustrated) is inserted into the chuck 21 and secured by a nut 22 so that the grinding tool can be secured to the rotary shaft 20. Numeral 24 indicates a front cap for covering the end of the rotary shaft 20. Numerals 26 and 27 indicate through-holes extended through the small-diameter portion 13 and rotary shaft 20 in the radius direction for receiving a lock pin to prevent rotation of the rotary shaft 20 when fastening the nut 22. A compressed-air intake channel 28 is formed at the rear end portion of the rotary shaft 20 in the axial direction.

A large-diameter portion 14 at the rear portion of the housing 12 has an internal thread 15 on the inner margin of the rear end. A large-diameter front portion 31 of a rear housing 30 with its rear-portion diameter smaller than front-portion diameter is fitted to the inner periphery of the large-diameter portion 14, an external thread 42 of a rear cap 40 having an internal thread 41 and external thread 42 on the inner and outer peripheries at the front portion is screwed to an internal thread 15 of the front housing with an O-ring 44 inserted between the front housing 12 and the cap 40, and the front end 43 of the cap 40 is contacted to the rear of a throttling section 32 perpendicular to the rotary axis line to secure the rear housing 30 in the large-diameter portion 14 of the front housing. Thus, a rotor chamber 49 is defined by the large-diameter portion 14 of the front housing and the large diameter front portion 31 of the rear housing 30 and a rotor 50 of an air motor is installed in the rotor chamber 49.

The rotor 50 mainly comprises the rotary shaft 20 and the rotor body 53 fitted to the rear portion of the rotary shaft 20. An air chamber 51 to which air is supplied is defined in the rotor body 53 and a jet hole 52 connected with the air chamber 51 is formed at the outer periphery of the rotor body 53.

The rotor 50 is normally equipped with a speed regulator to prevent excessive rotation and maintain a proper rotational speed. The speed regulator of this embodiment comprises a plurality of through-holes 54 radially extended in the rotor body 53, and a plurality of deformable balls 55 displacably received in each through-hole 54, controls the rotational speed of the rotor 50 by controlling the flow rate of the compressed air flowing by the air chamber 51 through deformation of the ball 55 which move in the radial directions depending on the centrifugal force.

In addition to the above speed regulator, the so-called butterfly weight type disclosed as Japanese utility model publication No. 35-23885 can also be used for controlling the opening of a speed regulation valve by turning a weight assembled in a frame directly connected to the rotor outward according to the rotational centrifugal force.

The following is the description of the structure of the rotor body 53 according to FIGS. 2 through 6. The rotor body 53 shown in FIG. 2 comprises the following two members: a concave front portion 56 in FIG. 3 and convex rear portion 57 in FIG. 4. When the both portions are fitted each other, the air chamber 51 forms an annulus as shown in FIG. 1.

Figure 2:
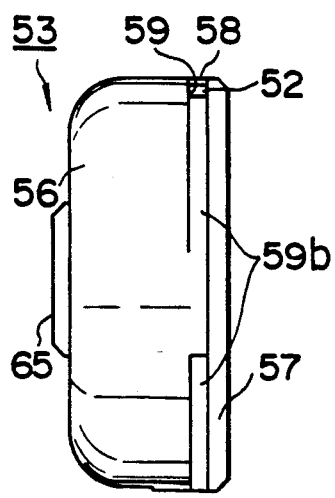
FIG. 2 is a side view of a rotor of the air motor in FIG. 1.
Figure 3:
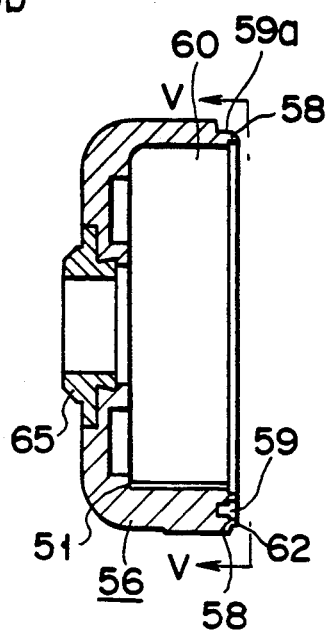
FIG. 3 is a sectional view of the front portion of the rotor in FIG. 2.
Figure 5:
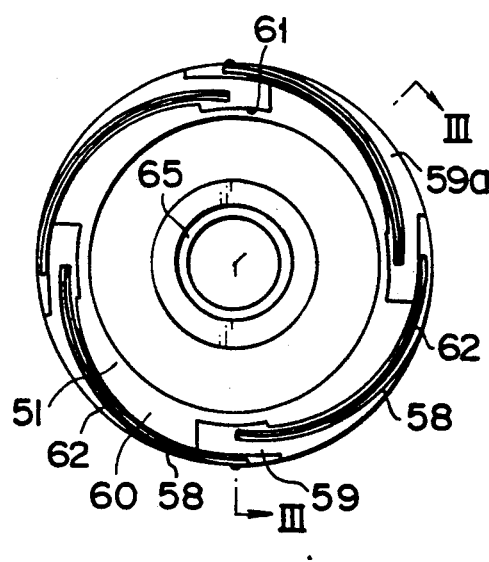
FIG. 5 is a drawing viewed from the line V—V in FIG. 3.

At the circular rear end of the front portion 56, as shown in FIG. 5, four curved ridges 58 extending from the inner periphery to outer periphery at the circular rear end are point symmetrically formed, the start and end points of adjacent ridges 58 are slightly overlapped, and a groove 59 is formed between the points. The groove 59 is formed into the jet hole 52 when the front portion 56 and rear portion 57 are fitted each other as shown in FIG. 2. As shown in FIG. 5, a space 59a arranged on the outer periphery of the curved ridge 58 and following the groove 59 is formed into a circumferential groove 59b when the both portions 56 and 57 are fitted each other.

At least two ridges 58 will be sufficient to be symmetrically arranged and it is preferable to extend the ridges as long as possible so that the amount of compressed air (mentioned later) can be more reserved. It is advantageous to set the groove 59 so that it is substantially parallel with the tangent of the outer periphery of the rotor because the torque of the rotor 50 increases.

As shown in FIG. 5, an approximately crescent shaped space is arranged between the air chamber 51 and the curved ridge 58 to, and serves as an air reservoir 60. That is, the approximately crescent shaped air reservoir 60 is formed inside the ridge 58 and the approximately crescent circumferential groove 59 is formed outside the ridge 58 when the portions 56 and 57 are fixed to each other. The joint between the air reservoir 60 and groove 59 is curved so that compressed air smoothly flows. The number of air reservoirs 60 may not necessarily be equal to the number of grooves 59 or the number of jet holes 52.

Numeral 61 in FIG. 5 designates a wall for restricting the movement of the ball 55 in the radially outward direction, and is installed near the start point of the inner periphery of the curved ridge 58 so that it faces the radially outside end of a through-hole 54. Numeral 62 designates a narrow ridge protruding rearwardly from the front end face of the curved ridge 58 to fit the both portions 56 and 57 to each other, and 65 designates a bushing to fit the front portion 56 to the rotary shaft 20.

Meanwhile, the rear portion 57, as previously mentioned is configured to form the air chamber 51 between the both portions 56 and 57 when the rear portion 57 is fitted into the concave front portion 56. Four through-holes 54 are extended in the rear portion 57, each hole 54 communicating between the air chamber 51 at the outer end and the intake channel 28 of the rotary shaft 20 at the inner end. Each through-hole 54 houses a deformable rubber ball 55 having a certain mass and a diameter slightly smaller than the inside diameter of the through-hole 54 so that the ball can freely move. The ball may be formed of various types of elastic materials instead of rubber. By determining the Poisson's ratio (ratio of elongation in the direction orthogonal to the centrifugal direction to compression in the centrifugal direction) of the ball before selecting an elastic material, the throttling ratio of the through-hole 54 can be changed. Therefore, the expected purpose can be achieved by considering not only the ball diameter but its properties.

Figure 4:
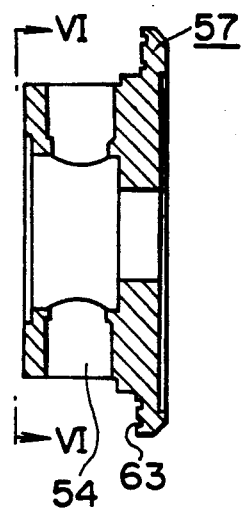
FIG. 4 is a sectional view of the rear portion of the rotor in FIG. 2.
Figure 6:
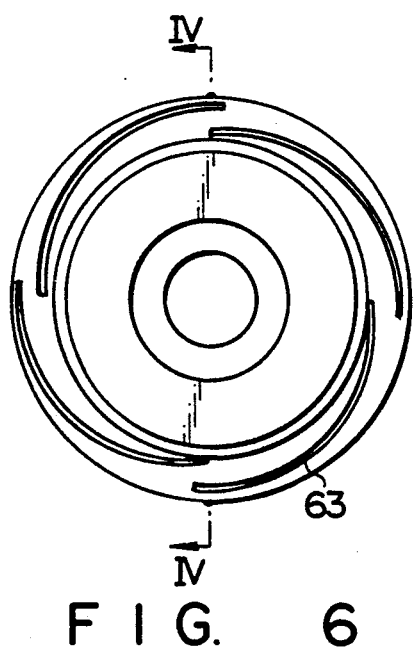
FIG. 6 is a drawing viewed from the line IV—IV in FIG. 4.

Numeral 63 in FIGS. 4 and 6 designates a curved groove corresponding to the narrow ridge 62. When the groove and ridge are fitted each other, the front portion 56 is integrated with the rear portion 57.

Numeral 66 in FIG. 1 designates an O-ring for sealing the gap between the front portion 56 and the rear portion 57.

The following is the description of the compressed-air valve system in FIG. 1.

A valve outside sleeve 70 is slidably fitted to the outer periphery of the small-diameter rear portion 33 of the rear housing 30 and a valve inside cylinder 72 with a compressed-air supply port 71 extended therethrough is fitted into the valve outside sleeve 70.

The valve outside sleeve 70 can be moved in the axial direction (horizontal direction in FIG. 1) by turning the external thread 73 formed on the outer periphery of the front portion of the valve outside sleeve 70 against the cap 40. When the valve outside sleeve 70 in FIG. 1 is maximally withdrawn, the O-ring 36 fitted to the circumferential groove formed on the tapered surface 35 at the rear end of the small-diameter rear portion of the rear housing 30 is separated from a valve seat 37 formed at the front end of the valve inside sleeve 72 as a reverse tapered surface to open the fluid channel 74 in the valve inside cylinder 72.

An air hose 75 for supplying air is connected to an air supply port 71 of the valve inside sleeve 72 by securing it with a hose band 76 and an exhaust hose 77 is connected to the rear open end 78 of the valve outside sleeve 70 by surrounding the air hose 75. The air expanded in the rotor chamber 49 flows into the exhaust hose 77 through an exhaust hole 79 formed on the valve outside sleeve 70 in parallel with the axis of the cylinder from an exhaust hole 39 formed on the throttling section 32 of the rear housing 30.

Numeral 81 designates a brake rod linked with the valve operation and 82 designates a brake disk secured to the rear surface of the rear portion 57. The brake means of the rotor 50 is comprised of the above two parts.

The functions of this embodiment are described below.

When the air valve in FIG. 1 is open, compressed air is led to the rotor body 53 from the intake channel 28 in the rotary shaft 20, reaches the air chamber 51 through each through-hole 54, flows through the air reservoir 60, and is jetted into the rotor chamber 49 from the jet hole 52. When the compressed air jets, torque is generated by its reaction in the rotor body 53 to rotate the rotor 50.

Because the compressed air jetted from the jet hole 52 does not immediately jet and disperse but it flows along the circumferential groove 59b formed in the end of the jet hole 52 in FIG. 2, it increases the torque of the rotor body 53.

The compressed air jetted into the rotor chamber 49 is exhausted from the exhaust hole 39.

When a large centrifugal force works on the ball 55 stored in the through-hole 54 thanks to rotation of the rotor body 53, the ball 55 is energized in the radially outward direction. Therefore, when no load or only a small load is applied to the rotational tool 10, the ball 55 contacts the control wall 61 and deforms due to the reaction in the direction orthogonal to the centrifugal direction to narrow the compressed-air channel and decrease the flow rate of the compressed air.

Meanwhile, when the load on the rotational tool 10 increases, the speed of the rotor body 53 instantaneously decreases but the kinetic energy of the compressed air remaining at the downstream position from the ball 55 contributes to the torque of the rotor body 53. For this embodiment, the instantaneously-decreased speed quickly increases again because a large amount of compressed air stored in the air chamber 51 and air reservoir 60 continuously jets from the jet hole 52.

Thus, because the centrifugal force applied to the ball 55 decreases when the speed of the rotor body 53 decreases, deformation of the ball 55 decreases and the sectional area of the through-hole 54 and supplied amount of compressed air increase, unlike the condition under no load. Consequently, the speed of the rotor body 53 is increased.

Therefore, because the speed and torque of the rotor body 53 changes according to the load of the rotational tool 10, high output can be obtained without sudden decrease of the output even if the load suddenly increases.

Meanwhile, to stop the rotational tool 10, the valve outside sleeve 70 advanced to close the fluid channel 74 and stop supplying the compressed air for driving. In this case, the brake rod 81 linking with the valve outside sleeve 70 advances and presses the brake disk 82 to brake it. Therefore, rotation of the rotor 50 immediately stops.

Figure 7:
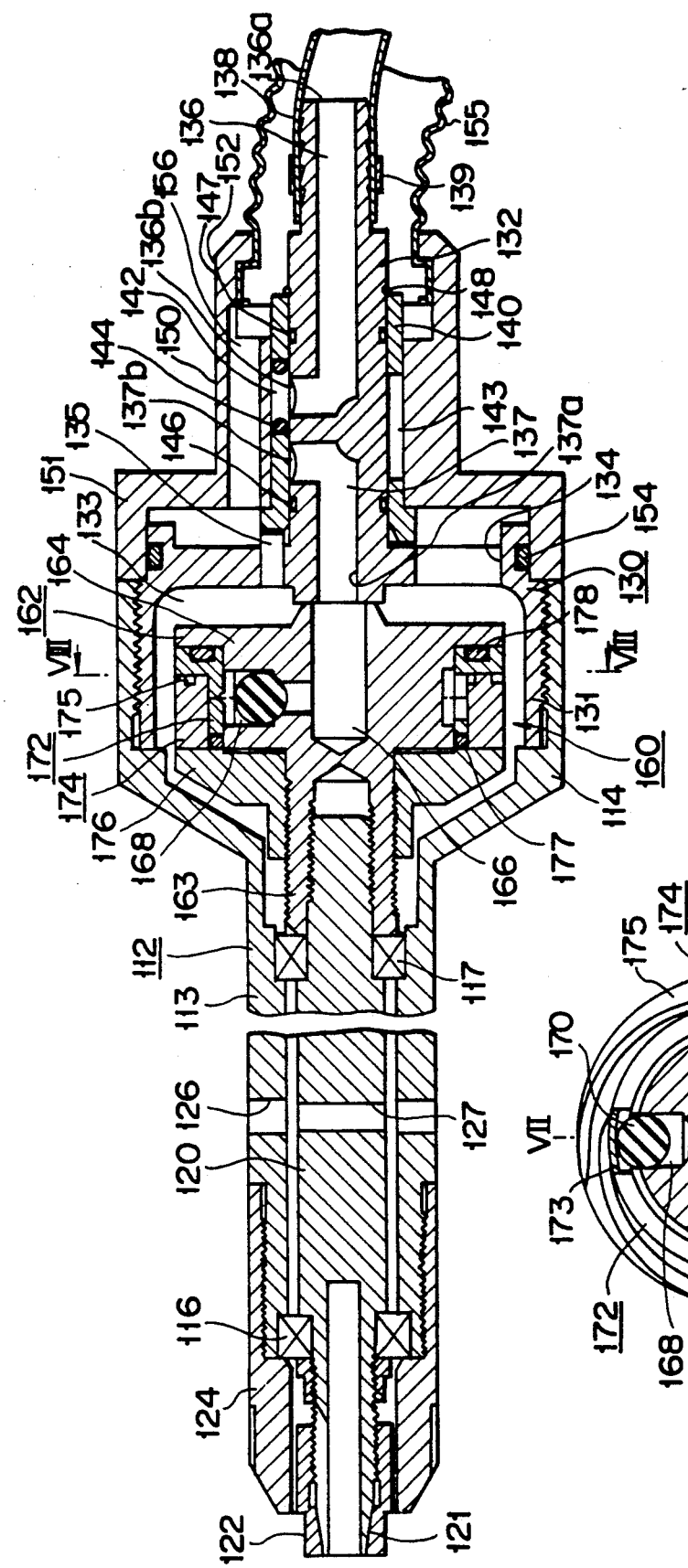
FIG. 7 is a longitudinal sectional view as same as FIG. 1 of a rotational tool using the air motor of another embodiment.
Figure 8:
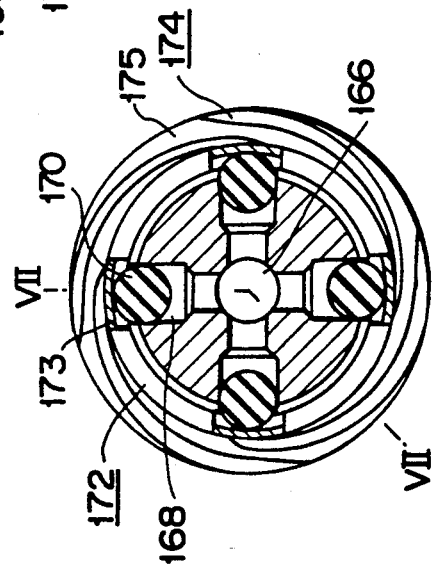
FIG. 8 is a sectional view long the line VIII—VIII in FIG. 7.

The following is the description of an air rational tool using the air motor of another embodiment according to FIGS. 7 and 8. FIG. 7 is a sectional view along the line VII—VII in FIG. 8 and FIG. 8 is a sectional view along the line VIII—VIII in FIG. 7.

In FIG. 7, numeral 112 is a stepped cylindrical front housing in which a rotary shaft 120 is supported by bearings 116 and 117 in the front portion 113 and a grinding or cutting member can be secured to the rotary shaft 120. The rotary shaft 120 has one end 121 formed into a chuck, for clamping a grinding member (not illustrated) of rotational tools such as an air grinder, and for fastening it with a nut 122.

Numeral 124 is a front cap for covering the end of the rotary shaft 120 and numerals 126 and 127 are through-hole extended in the front housing 112 and rotary shaft 120 in the radius direction for receiving a pin to prevent rotation of the rotary shaft 120 when fastening the nut 122.

A large-diameter portion 114 at the rear of the front housing 112 is formed with its inside hollow and a large-diameter front portion 131 of a stepped cylindrical rear housing 130 is screwed to the inside of the front housing 112. A large-diameter turbine chamber 133 is formed in the rear housing 130 and a turbine rotor 160 to be mentioned later is screwed to the rotary shaft 120 in the turbine chamber 133.

Compressed-air channels 136 and 137 are formed at a small-diameter rear portion 132 of the rear housing 130, an air hose 138 secured by a hose band 139 is connected to the rear end 136a of the channel 136, the front end 137a of the channel 137 opens into the large-diameter portion 131 of the rear housing 130, and other ends 136b and 137b of the channels 136 and 137 are opened toward the outer periphery of the small-diameter portion 132 by orienting the channels 136 and 137 in the radial direction at the middle portion of the rear housing 130. The small-diameter portion 132 of the rear housing 130 is air-tightly fitted into a valve inside sleeve 140.

The valve inside sleeve 140 is mounted so that it will rotate 180° about the axis of the rear housing 130. On the side wall of the sleeve 140, a small-diameter through-hole 142 is formed at the position facing a radially directed opening 136b connected to the channel 136 and a through-hole 143 with the diameter slightly larger than that of the through-hole 142 is formed at the position symmetrical to the axis of the through-hole 142 and the rear housing 130. In FIG. 7, the channels 136 and 137 are not connected. However, when turning the valve inside cylinder 140 by 180° relative to the rear housing 130, each of radially directed openings 136b and 137b connected with channels 136 and 137 faces the large-diameter through-hole 143. The rotational angle of the valve inside cylinder 140 relative to the casing 130 is limited to up to 180° by engaging the pin 135 installed on the large-diameter front portion 131 of the rear housing 130 with the semi-circular notch.

Numeral 144 denotes an O-ring for sealing the through-hole 142 formed on the valve inside cylinder 140, numerals 146 and 147 denote O-rings for sealing the sliding surface between rear housing 130 and valve inside cylinder 140, and numeral 148 denotes a stop ring for preventing the valve inside cylinder 140 from removing.

The valve inside cylinder 140 is fitted to the inner periphery of the rear portion 152 formed on the small-diameter portion of the valve outside cylinder 150. The large-diameter front portion 151 of valve outside cylinder 150 is fitted to the outer periphery of the large-diameter portion 131 through the O-ring 154 and the valve outside cylinder 150 can be rotated up to less than 180° from the rear housing 130.

An exhaust hose 155 surrounding the air hose 138 is connected to the rear open end of the small-diameter portion 152 of the valve outside cylinder 150, and the supplied compressed air passes through the channels 136 and 137, turbine chamber 133, exhaust hole 134 formed on the large-diameter portion 131 of the rear housing 130, exhaust hole 156 formed on the valve outside cylinder 150 in parallel with the axis center line of the valve outside cylinder 150, and exhaust hose 155.

For the turbine rotor 160, a turbine blade 174 or a guide ring comprising of a plurality of blade members is set to the periphery of a main shaft 162 together with a ring 172 for effectively stopping the movement of a ball 170 to be mentioned later and a nut 176 is screwed to a small-diameter front portion 163 of the main shaft 162 to secure the turbine blade 174 and ring 172 to the large-diameter rear portion 164 of the main shaft 162. In addition, the small-diameter front portion 163 of the main shaft 162 is screwed to the rotary shaft 120.

As shown in FIG. 8, a compressed-air intake channel 166 is formed on the large-diameter rear portion 164 of the main shaft 162 in the axial direction and four ball housing chambers 168 which are connected to the intake channel 166 and whose radially outer ends are open.

A deformable rubber ball 170 having a required mass and a diameter slightly smaller than that of the inside diameter of the ball housing chamber 168 is movably housed in each ball housing chamber 168. The ball 170 can use not only rubber but various types of elastic materials.

By determining the ratio of elongation in the direction orthogonal to the centrifugal direction to compression in the centrifugal direction of the ball 170, that is, Poisson's ratio, and selecting an elastic material for the wall, the throttling ratio of a channel to be mentioned later of the ball housing chamber 168 can be changed. Therefore, the amount of compressed air passing through the ball housing chamber 168 can be controlled by considering not only the ball diameter but its properties. A control piece 173 which the ball 170 contacts when it moves in the centrifugal direction is installed on the inner periphery of the ring 172 facing the ball housing chamber 168. Therefore, the ball 170 moving in the centrifugal direction can effectively be deformed by the control piece 173.

For each ball housing chamber 168 whose radially outer end is open, it is connected with a streamlined air guide groove 175 formed on the turbine blade 174. Numerals 177 and 178 are O-rings for sealing the air guide groove 175.

The following is the description of the function of the air motor of this embodiment.

When the valve outside sleeve 150 is half-turned around the small-diameter portion 132 of the rear housing 130 under the condition shown in FIG. 7, the inside sleeve 140 fitted to the inner periphery of the valve outside sleeve is also half-turned. Therefore, the channel 136 is connected with the channel 137 by the through-hole 143 and the driving compressed air is supplied to the turbine rotor 160.

The supplied compressed air quickly passes through the streamlined air guide groove 175 formed on the turbine blade 174 through each ball housing chamber 168 from the intake channel 166 and discharged to the turbine chamber 133 to generate torque of the main shaft 162. The torque is transmitted to the rotational tool connected through the rotary shaft 20.

When a large centrifugal force works on the ball 170 housed in the ball housing chamber 168 according to rotation of he turbine rotor 160, the ball 170 is energized in the centrifugal direction. Therefore, the ball 170 contacts to the inner concave surface of the control piece 173 when the rotational tool has no load or a small load. In this case, the ball 170 is deformed in the direction orthogonal to the centrifugal direction by the pressure of the inner surface of the control piece 173 to narrow the gap in compressed-air channel between the inner periphery of the ball housing chamber 168 and the surface of the ball 170 and decrease the flow rate of the compressed air.

Then, when the load of the rotational tool increases, the speed of the turbine rotor 160 instantaneously decreases. However, because the centrifugal force applied to the ball 170 decreases with the speed of the turbine rotor 160, deformation of the ball 170 decreases and the sectional area of the channel of the ball housing chamber 168 and the supplied amount of compressed air increase to accelerate the turbine rotor 160. Thus, because the speed of the turbine rotor 168 changes according to the load of the pneumatic tool, the required speed and high output ca be obtained without decrease of output at a low speed.

The pneumatic tool is stopped by half-turning the valve outside cylinder 150 around the small-diameter portion 132 of the rear housing 130 to disconnect the channel 136 from the channel 137 and stop supplying the driving compressed air as shown in FIG. 7. The turbine rotor 160 is more quickly stopped by installing a brake shoe in the turbine chamber 133 and pressing it against the turbine main shaft 162.

The above controller of the air motor for pneumatic tool controls the flow rate of compressed air applied to the turbine blade by means of deformation of the ball moving in the centrifugal or centripetal direction depending on the magnitude of centrifugal force. Therefore, the speed of the pneumatic tool rotary shaft can be maintained by a simple mechanism at the normal range by opening or closing the channel according to ball movement without using a system for transmitting the deformation of a member provided with centrifugal force to a controller or individual control system.

In addition, because the air motor comprises a small number of parts, it has advantages that it can easily be assembled, troubles rarely occur, the manufacturing cost is low, and it quickly responds to variation of the load applied to a rotational tool because of its simple structure.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An air motor used for a pneumatic tool, comprising:
   a housing including an air supply channel connected to a compressed air supply source and a rotor chamber defined in said housing;
   a rotor housed in said rotor chamber and having a rotary shaft rotatably supported in said housing, and a rotor body having a plurality of air jet nozzles about its periphery, said rotor body being mounted on said rotary shaft for rotation with said rotary shaft about an axis; said rotary body having a plurality of radially extending channels whose radially inner ends are connected to said air supply channel, an annular air chamber connected to radially outer ends of the channels, and a plurality of air reservoirs located outside said annular air chamber in communication with said annular air chamber and said air jet nozzles;
   said rotor body including a front portion having a cylindrical peripheral wall about the axis opening at its rearward end, and a rear portion coupled to said front portion at said rearward end thereof and forming an annular air chamber between the rear and front portions, each of said air reservoirs including a recess having an approximately crescent cross-section formed on said peripheral wall and said channels being carried by said rear portion;
   the peripheral wall of said front portion having a plurality of curved ridges projecting from the opening at its rearward end and being circumferentially spaced one from the other about said front portion, each curved ridge having one end at a location radially inwardly relative to the location of its opposite end, each said air jet nozzle being defined by one end of a ridge and the other opposite end of a circumferentially adjacent ridge.

2. An air motor according to claim 1, wherein said curved ridge defines a guide groove for guiding the air jetted from said air jet nozzle along the tangential direction of said rotor body.

3. An air motor according to claim 2, wherein each of channels of said rear portion houses a flow-rate control member for controlling the air flow rate responsive to the rotational speed of the rotor body.

4. An air motor according to claim 1, wherein said curved ridge has a narrow strip protruded approximately along the length of the ridge and said rear portion has a groove for receiving the narrow strip when the rear portion is coupled to the front portion.

5. A speed controller for an air turbine, adapted to be used for pneumatic tools, comprised of a housing including air supply channels connected to a compressed-air supply source and a turbine chamber defined in said housing, and a turbine rotor housed in aid turbine chamber, said turbine rotor having a rotary shaft rotatably supported in said housing and a large-diameter portion carried by the rotary shaft, said large-diameter portion having a guide ring circumferentially mounted thereon to form an air guide groove, an axially directed air intake channel connected to said air supply channel, and a plurality of radially directed intake channels for guiding compressed air from said air intake channel to the air guide groove; said speed controller comprising:
   a plurality of balls which are respectively housed in said radially directed intake channels, movable in a radial direction depending on the rotational speed of the turbine rotor, said balls being elastically deformable depending on the rotational speed of the turbine rotor to control the amount of the air passing through the radially directed intake channel.

6. A speed controller according to claim 5, further comprising a plurality of control pieces respectively arranged between said radially directed intake channels and the air guide groove for preventing said balls from moving in the radial direction.

7. A speed controller according to claim 6, wherein each said ball is made of rubber.

8. A speed controller according to claim 7, wherein each said ball has a diameter smaller than the diameter of the radially directed intake channel.

9. A speed controller according to claim 8, further comprising a ring arranged between said large-diameter portion and guide ring and characterized in that said plurality of control pieces are integrated with said ring.

* * * * *